Patented Nov. 24, 1936

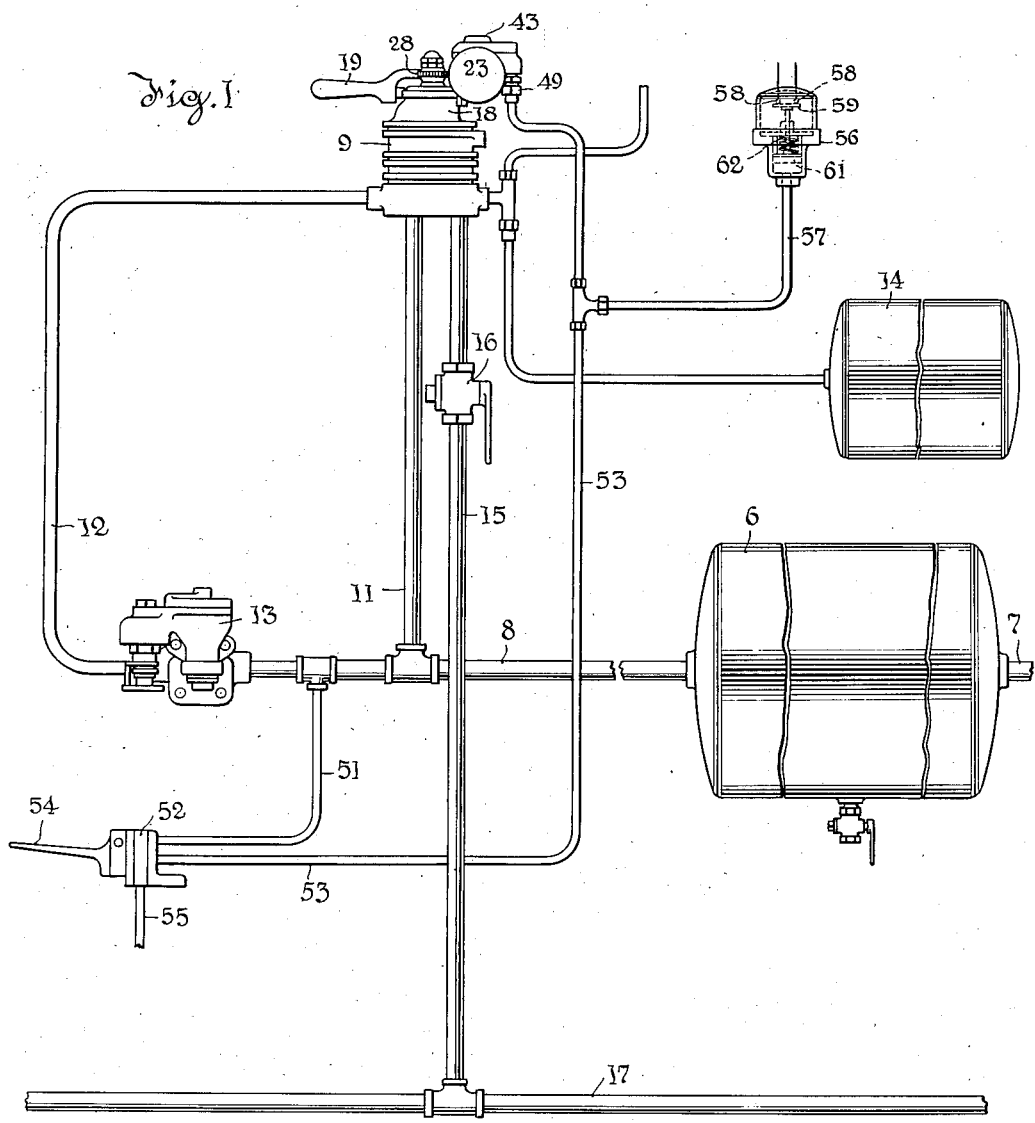

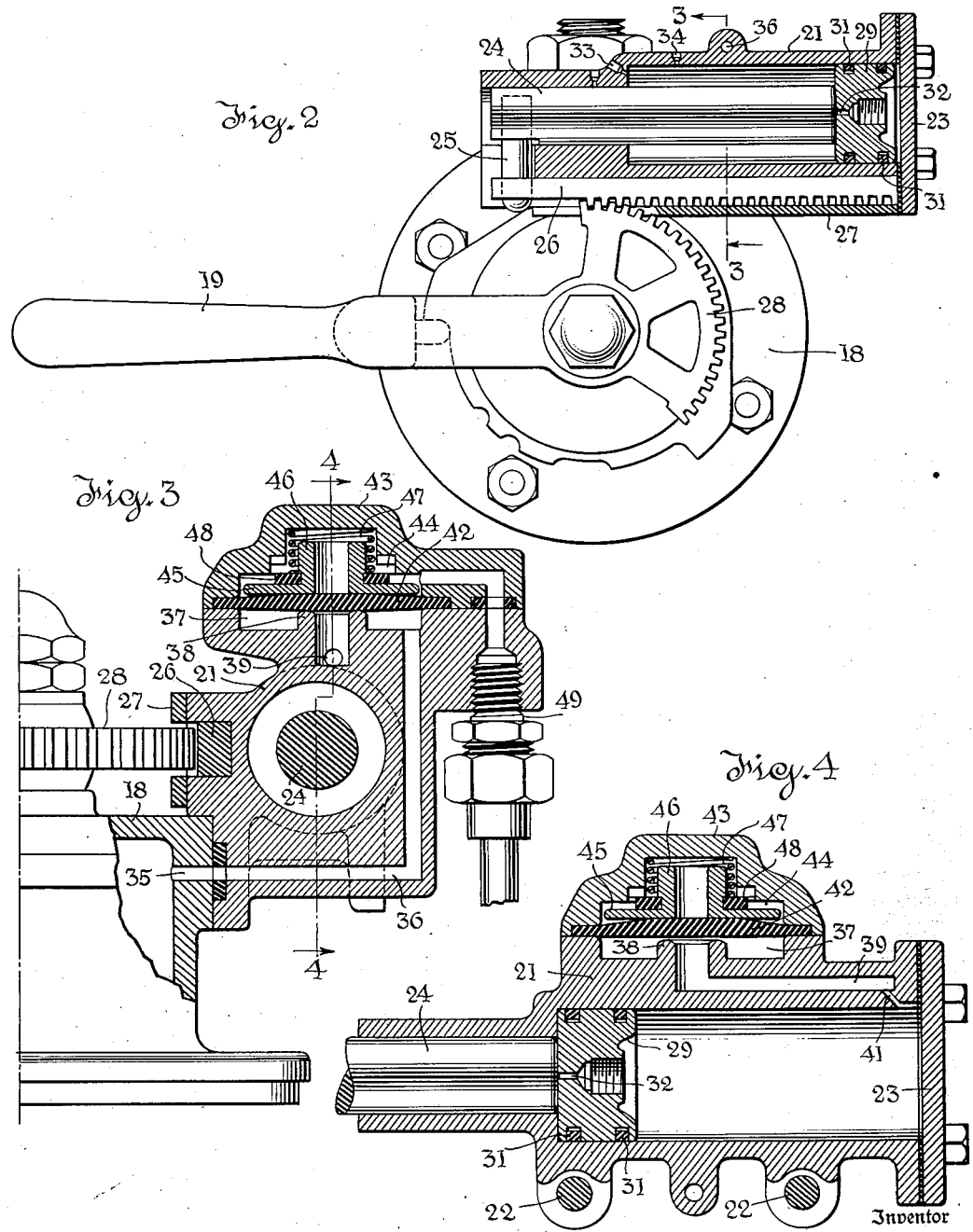

2,062,207

UNITED STATES PATENT OFFICE 2,062,207

AIR BRAKE

Charles A. Campbell, Watertown, N. Y., assignor to The New York Air Brake Company, a corporation of New Jersey Application July 18, 1935, Serial No. 32,081

3 Claims. (Cl. 303—19)

This invention relates to air brakes and particularly to devices for shifting an engineer's brake valve to an application position (service position, preferably), in response to the action of a deadman device, train control device or the like.

Shifting of the engineer's brake valve is effected by a pneumatic motor, and the arrangement of the motor is such that failure of pneumatic connections will produce an application, thus establishing a condition commonly known as "failure on the side of safety".

The invention will now be described as installed with a deadman control, in connection with the accompanying drawings:

Fig. 1 is a piping diagram showing a simple installation with the invention applied to the engineer's brake valve.

Fig. 2 is a plan view of the engineer's brake valve with the shifting motor in axial section.

Fig. 3 is a section on the line 3—3 of Fig. 2, drawn on a slightly enlarged scale.

Fig. 4 is a fragmentary section on the line 4—4 of Fig. 3.

Referring first to Fig. 1, the main reservoir 6 which is charged through connection 7, supplies air through pipe 8 to the engineer's brake valve 9. There is the usual direct connection 11 and the usual reduced pressure connection 12 through feed valve 13.

The engineer's brake valve is of the equalizing discharge type and hence is equipped with an equalizing reservoir 14. It may have the usual positions, for example "release", "running", "holding", "lap", "service" and "emergency", and is connected through branch 15 and double heading cock 16 with the brake pipe 17.

The arrangement so far described is conventional and is subject to wide variation even within the range of commercial practice.

The engineer's brake valve 9 includes a cap 18 and a handle 19 by which last the rotary valve is shifted to the various positions above mentioned. Mounted on cap 18 is the motor cylinder 21, which is held in place by bolts 22. Cylinder 21 has a removable head 23 at one end and at the other end a guide-way for a piston rod 24. Rod 24 is connected by offset 25 with a rack 26 slidably mounted in a guide-way on the side of cylinder 21. The rack 26 is confined by cover plate 27, and meshes with sector gear 28 formed integrally with the handle 19.

A piston 29 is mounted in cylinder 21 and enters into thrust relation with piston rod 24 but is not connected thereto. The piston has two packing rings 31 and a restricted through port 32 for bleeding away the actuating pressure fluid after an actuation.

The parts preferably are so dimensioned that when handle 19 is in full release position, piston 29 is at the head end of the cylinder (see Fig. 2), and when the piston has made its full outward traverse (see Fig. 4) the handle 19 is in service position. By a change of proportion the piston can be arranged to move handle 19 to emergency position, but it is believed to be better practice to move the handle 19 automatically to service, leaving it free to be shifted manually to emergency if necessary.

The rod end of the cylinder has a restricted vent 33, and a second restricted vent 34 which is so located as to be blanked by the piston 29 as it approaches the limit of its travel. In this way the arrest of the piston is cushioned.

The space within cap 18 is the rotary valve chamber and hence is at main reservoir pressure, as will be readily understood by those skilled in the art. From this chamber a passage 35 leads to a passage 36 which passes around cylinder 21 and terminates in an annular chamber 37 surrounding the valve seat rib 38. The space within seat rib 38 leads by way of passage 39 and restricted port 41 to the head end of cylinder 21.

A flexible diaphragm valve 42 is arranged to coact with seat 38 and is clamped between a portion of cylinder 21 and a cap 43, formed with a chamber 44 above the diaphragm. A thrust disc 45, with hollow neck 46 overlies diaphragm 42 and is urged in a valve seating direction by the coil compression spring 47. This is confined between the cap and a snap gasket 48 on neck 46.

A pressure connection 49 leads to chamber 44.

Reverting now to Fig. 1 the connections for the valve actuating motor will be explained. From main reservoir pipe 8 a branch 51 leads to a deadman foot valve 52 and from valve 52 a line 53 leads to connection 49. Valve 52 has a pedal 54 urged upward by a spring, (not shown) and an exhaust 55. When the pedal 54 is held down exhaust 55 is closed and lines 51 and 53 are connected with each other. If the pedal is released line 51 is blanked and line 53 is connected to exhaust 55. Deadman valves of this description are well known in the art.

If desired a pressure switch controlling propelling motors and indicated by the numeral 56 applied to its housing may be connected by branch 57 with line 53. This switch includes contacts 58 and coacting contactor 59. A piston 61 subject to pressure in line 57 closes the contactor against the contacts and a coil compression spring 62 urges the contactor in a reverse direction.

The deadman valve 52 is typical of any means for charging and venting line 53. When the line is charged with main reservoir air, the pressures above and below diaphragm 42 are equal and spring 47 seals the diaphragm against seat 38. Piston 29 is then inactive and contactor 59 is closed against contacts 58.

When line 53 is vented the space above diaphragm 42 is vented and main reservoir pressure lifts the diaphragm permitting main reservoir air to flow via 35, 36, 37, 39, 41 to the cylinder, forcing the piston 29 outward and shifting the engineer's brake valve to service position. At the same time contactor 59 moves away from contacts 58 and stops the flow of current to the propelling motors.

The important features of novelty are that the motor cylinder is mounted directly on the cap of the engineer's brake valve and derives its motive air directly therefrom, while the exposed pipes 51 and 53 must be kept charged or an application will occur. Hence a pipe failure causes an application. It is believed that the desirable feature of failure on the side of safety, has not heretofore been secured in a device of comparable compactness and simplicity.

As suggested the control valve, of which 52 is typical may assume the widest variety of forms and variations in the mechanical connection between motor and valve are within the skill of a mechanic.

What is claimed is:

1. The combination of an engineer's brake valve having a casing subject internally to fluid pressure and having a movable valve actuator; a fluid pressure motor in direct communication with the interior of said casing and having means for shifting said actuator to a brake applying position when the motor is subject to pressure; means for bleeding pressure fluid from said motor; a pressure transmitting connection; and means rendered effective by the existence of fluid pressure in said connection, to close communication between the interior of said casing and said motor.

2. The combination of an engineer's brake valve having a casing subject internally to fluid pressure, and having a movable valve actuator; a fluid pressure motor mounted directly on a portion of said casing, and including means for shifting said actuator to brake applying position when the motor is energized, there being a fluid transmitting connection directly from the interior of said casing to said motor; pressure actuated valve means having an opening tendency, controlling said connection; and valve means operable to subject said pressure actuated valve means to fluid pressure to hold the same closed, and to dissipate such closing pressure to permit the same to open.

3. The combination of an engineer's brake valve having a casing subject internally to fluid pressure, and having a movable valve actuator; a fluid pressure motor mounted directly on a portion of said casing, and including means for shifting said actuator to brake applying position when the motor is energized, there being a fluid transmitting connection directly from the interior of said casing to said motor; a combined diaphragm and valve for interrupting said connection, said valve diaphragm being subject in an opening direction to the fluid pressure in said casing; a spring urging said valve diaphragm in a direction to close said connection, said spring being insufficient to resist the opening action of said fluid pressure; and valve means operable alternately to develop and to dissipate a fluid pressure acting on said valve diaphragm in a closing direction.

CHARLES A. CAMPBELL.